Oct. 29, 1963
J. W. AGER, JR., ET AL
3,109,026
ORGANOBORON DICARBOXYLIC ACID HALIDES
AND THEIR PREPARATION
Filed Nov. 6, 1959
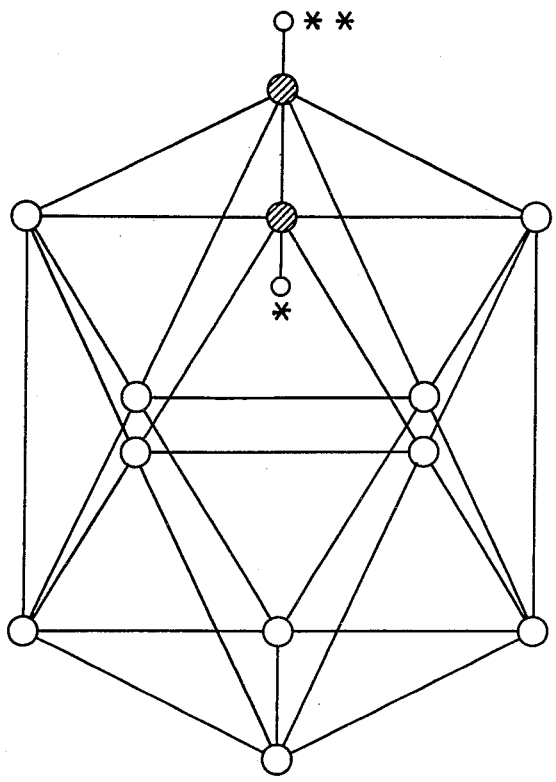
○ BORON
◎ CARBON
○ HYDROGEN ON CARBON
(HYDROGEN ATOMS ON BORON
OMMITTED FOR CLARITY)
*INVENTORS*
JOHN W. AGER, JR.
JOYCE A. REID
BY
*Adams, Forward and McLean*
ATTORNEYS United States Patent Office 3,109,026
Patented Oct. 29, 1963

3,109,026
ORGANOBORON DICARBOXYLIC ACID HALIDES AND THEIR PREPARATION
John W. Ager, Jr., Buffalo, and Joyce A. Reid, Tonawanda, N.Y., assignors to Olin Mathieson Chemical Corporation, a corporation of Virginia
Filed Nov. 6, 1959, Ser. No. 851,469
12 Claims. (Cl. 260—544)

This invention relates to organoboron carboxylic acid halides and to a method for their preparation. The organoboron carboxylic acid halides are prepared by the reaction of organoboron carboxylic acids of the class $RR'B_{10}H_8$ ($CR''CR'''$), wherein R and R' are each hydrogen or an alkyl group containing from 1 to 5 carbon atoms and wherein R'' and R''' are each a carboxyl radical or a carboxymethyl radical, or the cyclic carboxylic acid anhydrides of these acids, with an inorganic acid halide in the presence of a halogen. The reaction products prepared by the method of this invention are useful as fuels.

Organoboron carboxylic acids of the class $RR'B_{10}H_8$ ($CR''CR'''$), wherein R and R' are hydrogen or an alkyl group containing from 1 to 5 carbon atoms, and wherein R'' and R''' are both carboxyl groups, can be prepared according to the method described in application Serial No. 809,569, filed April 28, 1959 to John W. Ager, Jr. et al. For example, $B_{10}H_{10}[C(COOH)]_2$ can be prepared by reacting $B_{10}H_{10}(CHCH)$, obtained from the reaction of decaborane in tetrahydrofuran with acetylene at 125° C., with butyl lithium, treating the reaction mixture thus formed with carbon dioxide and subsequently hydrolyzing and acidifying the carbonated product.

Organoboron carboxylic acids of the class $RR'B_{10}H_8$ ($CR''CR'''$), wherein R and R' are hydrogen or an alkyl group containing from 1 to 5 carbon atoms, and wherein one of R'' and R''' is a carboxyl group and one of R'' and R''' is a carboxymethyl group, can be prepared according to the method described in application Serial No. 851,472, filed November 6, 1959, of John W. Ager, Jr.

Cyclic anhydrides of the organoboron carboxylic acids of the above classes can be prepared by reacting the carboxylic acid with an inorganic acid halide, such as phosphorous pentachloride, according to the method described in application Serial No. 851,471, filed of even date herewith, of John W. Szymanski.

The solid products prepared in accordance with the method of this invention, when incorporated with suitable oxidizers such as ammonium perchlorate, potassium perchlorate, sodium perchlorate, ammonium nitrate and the like, yield solid propellants suitable for rocket power plants and other jet propelled devices. Such propellants burn with high flame speeds, have high heats of combustion and are of the high specific impulse type. The solid products of this invention, when incorporated with oxidizers are capable of being formed into a wide variety of grains, tablets and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

In accordance with this invention, it was discovered that organoboron carboxylic acids of the type $RR'B_{10}H_8$ ($CR''CR'''$), wherein R, R', R'', and R''' have their previous significance, or the cyclic carboxylic acid anhydrides of said acids, can be halogenated with an inorganic acid halide in the presence of the corresponding halogen to give organoboron carboxylic acid halides.

Suitable inorganic acid halides include the halides and oxyhalides of phosphorus and sulfur such as phosphorous pentachloride, phosphorous trichloride, phosphorous oxychloride, thionyl chloride, sulfuryl chloride, sulfur chloride, phosphorous tribromide, phosphorous pentabromide, and phosphorous triiodide.

The preferred halogenating agents for producing organoboron carboxylic acid chlorides are phosphorous pentachloride in the presence of chlorine. Phosphorous trichloride in the presence of chlorine may also be employed, since it is converted rapidly and substantially quantitatively to phosphorous pentachloride under the conditions of the reaction. Other suitable halogenating agents are phosphorous tribromide in the presence of bromine to produce an organoboron carboxylic acid bromide and phosphorous triiodide in the presence of iodine to produce an organoboron carboxylic acid iodide.

To facilitate reaction, particularly when the reactants are solids, a mutual solvent may be employed. Phosphorous oxychloride is particularly well suited for this purpose when it is a product of the reaction, although other solvents such as carbon tetrachloride can be employed.

The ratio of reactants can vary considerably, although the amount of inorganic acid halide employed is preferably in excess of 2 moles per mole of organoboron dicarboxylic acid, or 1 mole per mole of organoboron dicarboxylic acid anhydride, to be halogenated. The temperature for the reaction of the organoboron compound with the halogenating agents is generally maintained between 50 and 150° C. and preferably between 70 and 100° C. The pressure employed can vary widely, although atmospheric pressure reactions are convenient.

The process of the invention is illustrated in detail by the following examples. In the examples, the term "moles" signifies gram moles.

EXAMPLE I

A mixture of 10 g. of $B_{10}H_{10}[C(COOH)]_2$, 24 g. of phosphorous pentachloride and 10 ml. of phosphorous oxychloride was heated at 90° C. for 2 hours in a 100 ml. 3 neck flask equipped with a water condenser and chlorine inlet below the surface of the liquid. Chlorine was then bubbled through for 1 hour while the reaction mixture was maintained at 90° C. The phosphorous oxychloride was removed by distillation at reduced pressure. The residue was extracted with n-pentane, filtered, and the pentane was distilled. The resulting slightly yellow solid was sublimed to give 8.5 g. of white solid. Duplicate analysis showed the product to contain 40.0, 39.4 percent boron, and quadruplicate analysis showed the product to contain 31.5, 31.0, 31.2, 31.3 percent chlorine.

EXAMPLE II

A mixture of 10 g. of $B_{10}H_{10}[C(COOH)]_2$, 40 g. of phosphorous pentachloride and 40 ml. of phosphorous oxychloride was heated at 90° C. for 2 hours. Chlorine was then bubbled through for 1 hour while the reaction mixture was maintained at 90° C. The phosphorous oxychloride was distilled at reduced pressure and the residue was extracted with n-pentane. The pentane solution was filtered and distilled. The residue was 10.7 g., a 93 percent yield, of a white crystalline solid which mass spectrometric analysis indicated was almost pure $B_{10}H_{10}[C(COCl)]_2$.

EXAMPLE III

A mixture of 5 g. of $B_{10}H_{10}[C(COOH)]_2$, 15 g. of phosphorous pentachloride and 30 ml. of phosphorous oxychloride was heated at 85° C. for 2 hours. Chlorine was then bubbled through for 1 hour while the reaction mixture was maintained 85° to 90° C. Phosphorous oxychloride was then distilled at reduced pressure and the residue was extracted twice with 75 ml. portions of n-pentane. The combined pentane extracts were filtered and the pentane was distilled. The residue was a white crystalline solid which was shown by mass spectrometric analysis to be $B_{10}H_{10}[C(COCl)]_2$ with very little $B_{10}H_{10}C_2(CO)_2O$ (anhydride) and very little higher chlorination products.

EXAMPLE IV

A mixture of 5 g. of $B_{10}H_{10}[C(COOH)]_2$, 10 g. of phosphorous pentachloride and 50 ml. of carbon tetrachloride was refluxed for 7 hours with chlorine bubbling through. Not all the phosphorous pentachloride was used up. Mass spectrometric analysis of the product indicated very little higher chlorination products. The ratio of $B_{10}H_{10}[C(COCl)]_2$ to $B_{10}H_{10}C_2(CO)_2O$ was 1:4.

EXAMPLE V

A mixture of 10 g. of $B_{10}H_{10}[C(COOH)]_2$, 19 g. of phosphorous pentachloride and 50 ml. of phosphorous oxychloride was heated in an oil bath at 80° C. for 4 hours with chlorine bubbling through. The phosphorous oxychloride was distilled off under reduced pressure and the residue was dissolved in about 75 ml. of n-pentane and filtered. The pentane was distilled off and the residue was distilled at about 1 mm. Hg pressure absolute and 80° C. The solid product weighed 9.35 g., an 82 percent yield, if pure. Mass spectrometric analysis indicated that the product consisted of 85 percent $B_{10}H_{10}[C(COCl)]_2$, 10 percent $B_{10}H_{10}C_2(CO)_2O$ and 5 percent higher chlorination products.

EXAMPLE VI

In a 250 ml. round-bottom flask equipped with a gas inlet tube were placed 30 g. (0.136 mole) of $B_{10}H_{10}[C(COOH)]_2$, 71 g. (0.327 mole) of phosphorous pentachloride, and 12 ml. of phosphorous oxychloride, in that order. The addition of the phosphorous oxychloride initiated dissolution and the dehydration reaction. The flask was immersed in an oil bath maintained at 80 to 90° C. for 1.5 hours. Chlorine was then introduced through the gas inlet tube in a moderate stream for 1.5 hours while the temperature was maintained at 90° C. The volatile phosphorous oxychloride was removed by evaporation under aspirator vacuum, and the residue was extracted with n-pentane in order to separate the product from the excess phosphorous pentachloride. After vacuum evaporation of the pentane, the residue was sublimed under vacuum. The white crystalline product weighed 28 g., 77 percent of theoretical. The $B_{10}H_{10}[C(COCl)]_2$ product softened at 35° C. and melted at 53 to 57° C.

EXAMPLE VII

A 1000 ml. 3 neck flask was equipped with a condenser which was closed with a calcium chloride tube. The other necks were closed with plugs. 80 g. of $B_{10}H_{10}[C(COOH)]_2$, 183 g. $PCl_5$, and 25 ml. $POCl_3$ were charged to the flask. The mixture immediately began foaming and became liquid. It was heated 2 hours at 90 to 100° C. This temperature was maintained and chlorine was bubbled through at a moderate rate for 2 additional hours. The $POCl_3$ was removed at reduced pressure and the viscous material remaining was extracted 3 times with 500 ml. of n-pentane and filtered in a dry box. The pentane was removed and 66 g. of acid chloride was obtained as a white solid by sublimation. Mass spectrometric analysis showed the product to be $B_{10}H_{10}[C(COCl)]_2$ with no outstanding contaminants.

EXAMPLE VIII 100 g. $PCl_5$ and 25 ml. $POCl_3$ were mixed in a 500 ml. 3 neck flask. 40 g. of $B_{10}H_{10}[C(COOH)]_2$ were added in portions. The mixture was heated 2½ hours at 90 to 100° C. and an additional 2 hours while chlorine was bubbled through. The product was purified as in Example VII except that the final purification was made by distillation.

EXAMPLE IX 2.1 g. of $B_{10}H_{10}C_2(CO)_2O$ were dissolved in 4 ml. of phosphorous trichloride. The mixture was heated at 80° C. for ½ hour while chlorine was bubbled through. The mixture became solid, the heating and the chlorine were stopped and a sample of the material was obtained for mass spectrometric analysis, which reported evidence for the presence of $B_{10}H_{10}[C(COCl)]_2$.

EXAMPLE X

A mixture of 5 g. of $B_{10}H_{10}C_2(CO)_2O$, 3.2 g. of phosphorous trichloride and 25 ml. of phosphorous oxychloride were heated at 80° C. for 1 hour with chlorine bubbling through. The phosphorous oxychloride was then distilled at reduced pressure and the residue was distilled at about 3 mm. Hg pressure absolute and 80° C. Mass spectrometric analysis indicated the presence of $B_{10}H_{10}[C(COCl)]_2$ and $B_{10}H_{10}C_2(CO)_2O$.

A small amount of this product was added to anhydrous methanol in a test tube. There was a vigorous reaction. The methanol solution was poured into water and neutralized with sodium bicarbonate. The mixture was extracted with ether and the ether solution was dried with anhydrous magnesium sulfate and distilled. The residue was a solid which was shown by infrared analysis to be $B_{10}H_{10}[C(COOH_3)]_2$.

The boron-containing solid materials produced by practicing the method of this invention can be employed as ingredients of solid propellant compositions in accordance with general procedures which are well understood in the art, inasmuch as the solids produced by practicing the present process are readily oxidized using conventional solid oxidizers, such as ammonium perchlorate, potassium perchlorate, sodium perchlorate, ammonium nitrate and the like. In formulating a solid propellant composition employing one of the materials produced in accordance with the present invention, generally from 10 to 35 parts by weight of boron-containing material and 65 to 90 parts by weight of the oxidizer are used. In the propellant, the oxidizer and the product of the present process are formulated in admixture with each other by finely subdividing each of the materials and thereafter intimately mixing them. The purpose of doing this, as the art is well aware, is to provide proper burning characteristics in the final propellant. In addition to the oxidizer and the oxidizable material, the final propellant can also contain an artificial resin, generally of the urea-formaldehyde or phenol-formaldehyde type. The function of the resin is to to give the propellant mechanical strength and at the same time improve its burning characteristics. Thus, in the manufacture of a suitable propellant, proper proportions of finely divided oxidizer and finely divided boron-containing material can be admixed with a high solids content solution of partially condensed urea-formaldehyde or phenol-formaldehyde resin, the proportions being such that the amount of resin is about 5 to 10 percent by weight based upon the weight of oxidizer and boron compound. The ingredients can be thoroughly mixed with simultaneous removal of solvent, and following this, the solvent free mixture can be molded into the desired shape as by extrusion. Thereafter, the resin can be cured by resorting to heating at moderate temperatures. For further information concerning the formulation of solid propellant compositions, reference is made to U.S. Patent 2,622,277 to Bonnell and to U.S. Patent 2,646,596 to Thomas.

The compound of the formula $B_{10}H_{10}[C(COCl)]_2$ produced in Examples I through X has the same structural formula as that shown in the accompanying drawing except that the hydrogen atoms indicated by each of the single and double asterisk are replaced by the radical —COCl.

Reference is made to Chemistry of the Hydrides, by Dallas T. Hurd, 1952, for a structural representation of the elementary decaborane molecule. The compounds of the instant invention may be considered as structural derivatives of decaborane, but include in addition atoms of carbon, oxygen, and halogen.

We claim:

1. $RR'B_{10}H_8(CR''CR''')$ having a structural formula of the type shown in the accompanying drawing wherein R and R' are each selected from the class consisting of hydrogen and an alkyl radical containing from 1 to 5 carbon atoms, wherein R'' and R''' are each a radical selected from the class consisting of —COX and —CH$_2$COX, X being a halogen, and at least one of R'' and R''' being the radical —COX.

2. $B_{10}H_{10}[C(COCl)]_2$ having a structural formula of the type shown in the accompanying drawing.

3. A method for the production of an organoboron carboxylic acid halide having a structural formula of the type shown in the accompanying drawing which comprises reacting at a temperature of 50° to 150° C. with the evolution of hydrogen halide an organoboron compound selected from the class consisting of organoboron discarboxylic acids and organoboron dicarboxylic acid anhydrides with an inorganic acid halide in admixture with free halogen corresponding to the halogen component of the inorganic acid halide, the organoboron carboxylic acids being of the class $RR'B_{10}H_8 (CR''CR''')$ wherein R and R' are each selected from the group consisting of hydrogen and an alkyl radical containing from 1 to 5 carbon atoms and wherein R'' and R''' are each selected from the group consisting of a carboxyl radical and a carboxymethyl radical, at least one of R'' and R''' being a carboxyl radical, and the organoboron dicarboxylic acid anhydrides being the cyclic anhydrides of organoboron dicarboxylic acids of the class $RR'B_{10}H_8(CR''CR''')$ wherein R, R', R'' and R''' have their previous significance.

4. The method of claim 3 wherein the reaction is carried out while the reactants are dissolved in a mutual inert solvent.

5. The method of claim 3 wherein the organoboron compound is $B_{10}H_{10}[C(COOH)]_2$.

6. The method of claim 4 wherein the organoboron compound is $B_{10}H_{10}[C_2(CO)_2O]$.

7. The method of claim 3 wherein the inorganic acid halide is phosphorous pentachloride and the free halogen is chlorine.

8. The method of claim 3 wherein the inorganic acid halide is phosphorous trichloride and the free halogen is chlorine.

9. The method of claim 4 wherein the organoboron compound is $B_{10}H_{10}[C(COOH)]_2$, the inorganic acid halide is phosphorous pentachloride, the free halogen is chlorine, and the mutual inert solvent is phosphorous oxychloride.

10. The method of claim 4 wherein the organoboron compound is $B_{10}H_{10}[C(COOH)]_2$, the inorganic acid halide is phosphorous pentachloride, the free halogen is chlorine, and the mutual inert solvent is carbon tetrachloride.

11. The method of claim 3 wherein the organoboron compound is $B_{10}H_{10}[C(COOH)]_2$, the inorganic acid halide is phosphorous trichloride, and the free halogen is chlorine.

12. The method of claim 4 wherein the organoboron compound is $B_{10}H_{10}C_2(CO)_2O$, the inorganic acid halide is phosphorous trichloride, the free halogen is chlorine, and the mutual inert solvent is phosphorous oxychloride.

No references cited.